(12) United States Patent
Luo et al.

(10) Patent No.: US 9,137,076 B2
(45) Date of Patent: Sep. 15, 2015

(54) METHOD AND APPARATUS FOR MUTIPLEXING REFERENCE SIGNAL AND DATA IN A WIRELESS COMMUNICATION SYSTEM

(75) Inventors: Xiliang Luo, San Diego, CA (US); Juan Montojo, San Diego, CA (US); Peter Gaal, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1125 days.

(21) Appl. No.: 12/913,684

(22) Filed: Oct. 27, 2010

(65) Prior Publication Data

US 2011/0128909 A1      Jun. 2, 2011

Related U.S. Application Data

(60) Provisional application No. 61/256,895, filed on Oct. 30, 2009.

(51) Int. Cl.
*H04L 27/00* (2006.01)
*H04L 27/26* (2006.01)
*H04L 5/00* (2006.01)

(52) U.S. Cl.
CPC .......... *H04L 27/2613* (2013.01); *H04L 5/0023* (2013.01); *H04L 5/0037* (2013.01); *H04L 5/0051* (2013.01)

(58) Field of Classification Search
CPC ... H04L 27/00; H04L 27/2613; H04L 5/0051; H04L 5/0023; H04L 5/0037
USPC .................................................. 370/329, 341
See application file for complete search history.

(56) References Cited

U.S. PATENT DOCUMENTS

| 8,208,434 B2 * | 6/2012 | Sayana et al. ................. 370/329 |
| 8,289,946 B2 | 10/2012 | Luo et al. |
| 8,644,397 B2 * | 2/2014 | Gaal et al. ..................... 375/259 |

(Continued)

FOREIGN PATENT DOCUMENTS

| CN | 1525674 A | 9/2004 |
| EP | 1775770 A1 | 4/2007 |

(Continued)

OTHER PUBLICATIONS

Taiwan Search Report—TW099137519—TIPO—Aug. 10, 2013.

(Continued)

*Primary Examiner* — Jay P Patel
(74) *Attorney, Agent, or Firm* — Paul Kuo

(57) ABSTRACT

Techniques for efficiently multiplexing a reference signal and data on different sets of subcarriers in the same symbol period are described. In one design, a user equipment (UE) performs a discrete Fourier transform (DFT) on a set of modulation symbols for data to obtain data symbols. The UE also obtains reference symbols generated based on a reference signal sequence corresponding to a cyclic shift of a base sequence. The UE maps the reference symbols to a first set of subcarriers and maps the data symbols to a second set of subcarriers. The UE then generates a transmission symbol based on the mapped reference symbols and the mapped data symbols. The UE may also transmit reference signals and data (i) in multiple symbol periods of a slot or a subframe and/or (ii) from multiple antennas using frequency division multiplexing (FDM) or code division multiplexing (CDM).

40 Claims, 10 Drawing Sheets

(56) References Cited

U.S. PATENT DOCUMENTS

| | | | |
|---|---|---|---|
| 2008/0279170 A1* | 11/2008 | Malladi et al. | 370/343 |
| 2008/0298502 A1* | 12/2008 | Xu et al. | 375/299 |
| 2008/0304583 A1 | 12/2008 | Miyoshi et al. | |
| 2009/0067370 A1* | 3/2009 | Kim et al. | 370/328 |
| 2009/0296563 A1 | 12/2009 | Kishiyama et al. | |
| 2010/0067464 A1* | 3/2010 | Higuchi | 370/329 |
| 2010/0080154 A1* | 4/2010 | Noh et al. | 370/310 |
| 2010/0111044 A1 | 5/2010 | Kawamura et al. | |
| 2010/0260154 A1* | 10/2010 | Frank et al. | 370/336 |
| 2010/0266060 A1* | 10/2010 | Kimura et al. | 375/267 |
| 2011/0019694 A1* | 1/2011 | Kwon et al. | 370/474 |
| 2011/0075651 A1* | 3/2011 | Jia et al. | 370/344 |
| 2011/0134867 A1* | 6/2011 | Lee et al. | 370/329 |
| 2011/0141982 A1* | 6/2011 | Zhang et al. | 370/329 |
| 2011/0158342 A1* | 6/2011 | Srinivasan et al. | 375/285 |
| 2011/0170629 A1* | 7/2011 | Lee et al. | 375/295 |
| 2012/0263136 A1* | 10/2012 | Higuchi | 370/329 |
| 2012/0269136 A1* | 10/2012 | Seo et al. | 370/329 |
| 2012/0327981 A1* | 12/2012 | Sayana et al. | 375/219 |
| 2013/0034077 A1* | 2/2013 | Nakao et al. | 370/329 |

FOREIGN PATENT DOCUMENTS

| | | |
|---|---|---|
| JP | 2007089113 A | 4/2007 |
| JP | 2007194751 A | 8/2007 |
| JP | 2009005060 A | 1/2009 |
| JP | 2009533941 A | 9/2009 |
| KR | 20070036147 A | 4/2007 |
| WO | 2006011376 A1 | 2/2006 |
| WO | WO2007021370 A1 | 2/2007 |
| WO | 2007117127 A1 | 10/2007 |
| WO | 2008106317 A1 | 9/2008 |
| WO | 2008144363 A2 | 11/2008 |
| WO | 2009031816 A1 | 3/2009 |
| WO | 2009131345 A1 | 10/2009 |

OTHER PUBLICATIONS

International Search Report and Written Opinion—PCT/US2010/054815, ISA/EPO—May 12, 2011.

Minn H., et al., "Optimal Training Signals for MIMO OFDM Channel Estimation", Global Telecommunications Conference, 2004. Globecomm "04. IEEE Dallas, TX, USA, Nov. 29-Dec. 3, 2004, Piscataway, NJ, USA, IEEE, Nov. 29, 2004, pp. 219-224, vol. 1, XP010758884, ISBN: 0-7803-8794-5.

Osamu Takyu et al., "Scattered pilot assisted channel estimation for IFDMA", Wireless Communication, Vehicular Technology, Information Theory and Aerospace & Electronic Systems Technology, 2009, Wireless Vitae 2009, 1st International Conference on, IEEE, Piscataway, NJ, USA, May 17, 2009, pp. 832-836, XP031495959, ISBN: 978-1-4244-4066-5.

* cited by examiner

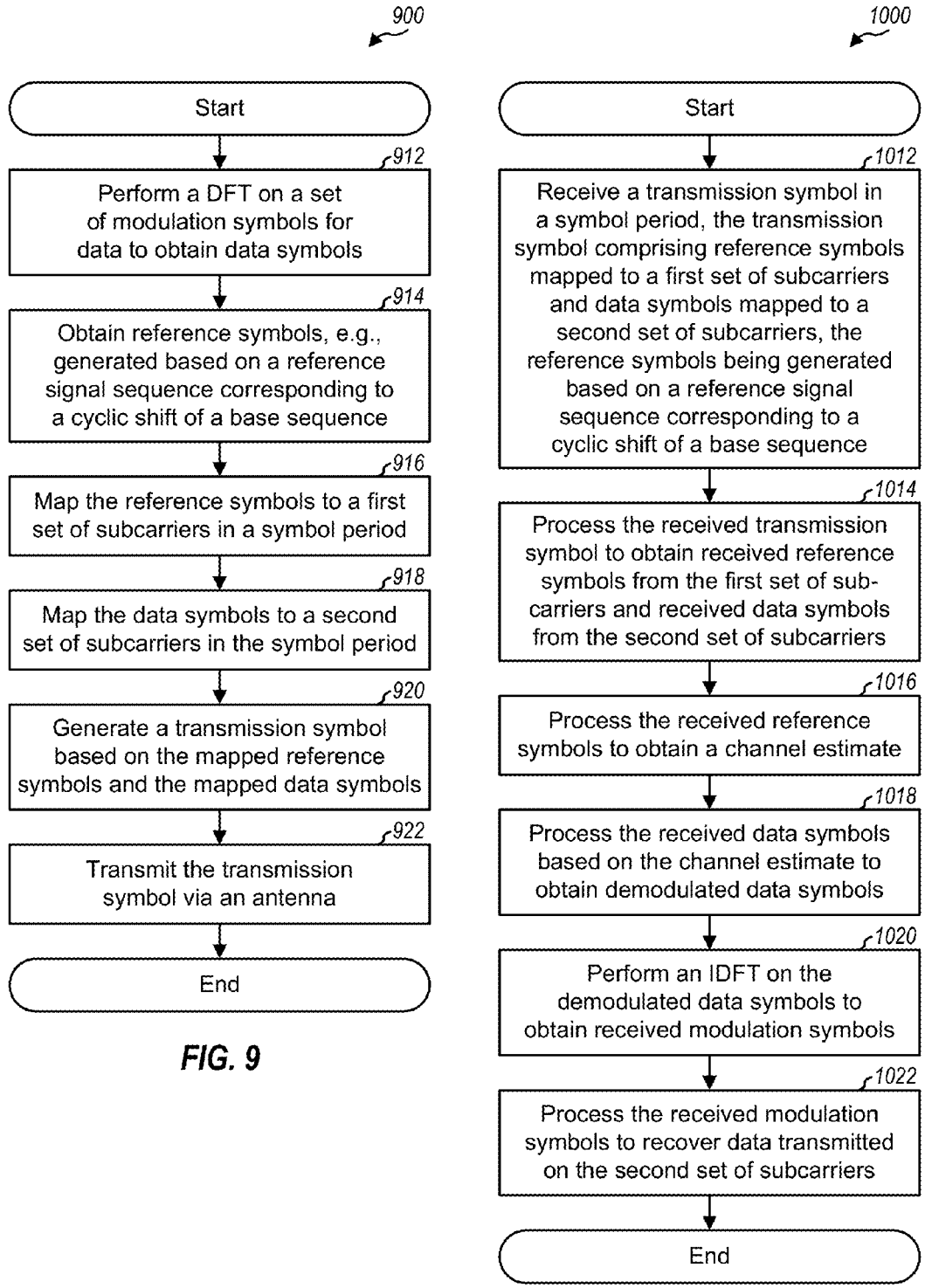

METHOD AND APPARATUS FOR MUTIPLEXING REFERENCE SIGNAL AND DATA IN A WIRELESS COMMUNICATION SYSTEM

The present application claims priority to provisional U.S. Application Ser. No. 61/256,895, entitled "FLEXIBLE DEMODULATION REFERENCE SIGNAL OVERHEAD FOR LTE-A PHYSICAL UPLINK SHARED CHANNEL," filed Oct. 30, 2009, and incorporated herein by reference.

BACKGROUND

I. Field

The present disclosure relates generally to communication, and more specifically to techniques for transmitting reference signal and data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may transmit a reference signal and data to the base station. The reference signal may be used for channel estimation, data demodulation, and/or other purposes. The reference signal may be useful, but resources are consumed to transmit the reference signal. It is desirable to transmit the reference signal and data as efficiently as possible in order to improve resource utilization.

SUMMARY

Techniques for efficiently transmitting a reference signal and data are described herein. In an aspect, a reference signal and data may be multiplexed and transmitted on different sets of subcarriers in the same symbol period using frequency division multiplexing (FDM). In particular, the reference signal may be transmitted on a subset of M subcarriers assigned to a UE for transmission. Data may be transmitted on the remaining subcarriers not used for the reference signal. The reference signal and data may be flexibly multiplexed based on a tradeoff between overhead, channel estimation performance, data throughput, etc.

In one design, a UE may perform a discrete Fourier transform (DFT) on a set of modulation symbols for data to obtain data symbols. The UE may obtain reference symbols, which may be generated based on a reference signal sequence corresponding to a cyclic shift of a base sequence. The base sequence may comprise a Zadoff-Chu sequence, or a computer-generated sequence, or some other sequence having good correlation properties. The reference symbols may be for a demodulation reference signal (DMRS) used to demodulate the data symbols or some other reference signal.

The UE may map the reference symbols to a first set of subcarriers in a symbol period. The UE may map the data symbols to a second set of subcarriers in the symbol period. The UE may generate a transmission symbol based on the mapped reference symbols and the mapped data symbols. The UE may transmit the transmission symbol via an antenna at the UE. The UE may also multiplex and transmit reference signals and data (i) in multiple symbol periods of a slot or a subframe and/or (ii) from multiple antennas using frequency division multiplexing (FDM) or code division multiplexing (CDM).

In one design, a base station may receive the transmission symbol comprising the reference symbols mapped to the first set of subcarriers and the data symbols mapped to the second set of subcarriers. The base station may process the received transmission symbol to obtain received reference symbols from the first set of subcarriers and received data symbols from the second set of subcarriers. The base station may process the received reference symbols to obtain a channel estimate. The base station may process the received data symbols based on the channel estimate to obtain demodulated data symbols. If data is transmitted with DFT precoding, then the base station may perform an inverse DFT (IDFT) on the demodulated data symbols to obtain received modulation symbols. The base station may further process the received modulation symbols to recover the data transmitted on the second set of subcarriers.

Various aspects and features of the disclosure are described in further detail below.

BRIEF DESCRIPTION OF THE DRAWINGS

FIG. 9 shows a process for transmitting a reference signal and data.

FIG. 10 shows a process for receiving a reference signal and data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
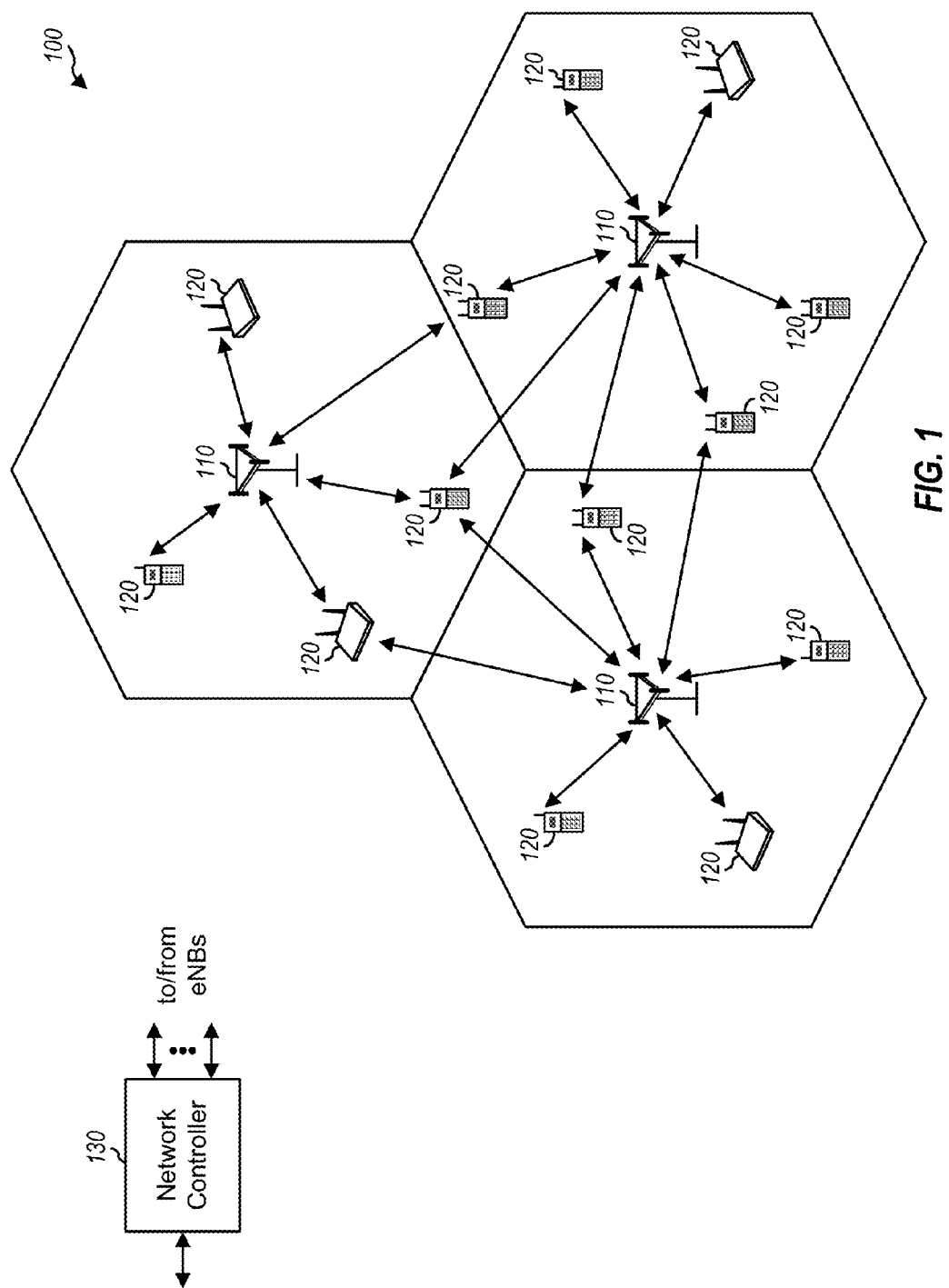
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a Node B, a base station, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may comprise a Mobile Management Entity (MME) and/or some other network entity.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the subcarrier spacing may be 15 kilohertz (KHz), and K may be equal to 128, 256, 512, 1024 or 2048 for system bandwidth of 1.4, 3, 5, 10 or 20 megahertz (MHz), respectively. The system bandwidth may correspond to a subset of the K total subcarriers, and the remaining subcarriers may serve as guard band.

Figure 2:
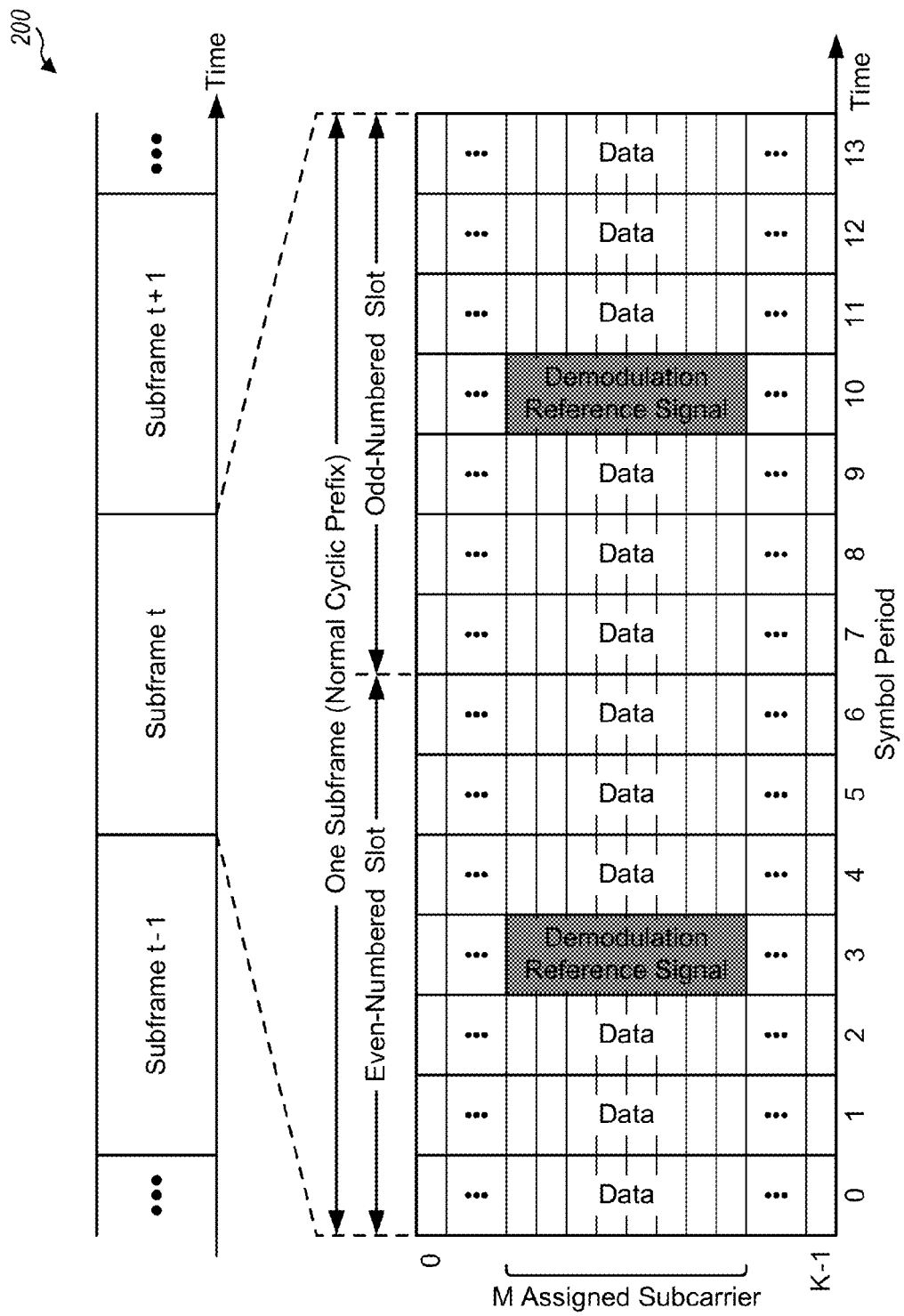
FIG. 2 shows an exemplary transmission structure for the uplink.

FIG. 2 shows a transmission structure 200 that may be used for the uplink in LTE. The transmission timeline for the uplink may be partitioned into units of subframes. Each subframe may have a predetermined duration, e.g., one millisecond (ms), and may be partitioned into two slots. Each slot may cover Q symbol periods, where Q may be dependent on the cyclic prefix length. For example, each slot may cover six symbol periods for an extended cyclic prefix (not shown in FIG. 2) or seven symbol periods for a normal cyclic prefix (as shown in FIG. 2). A number of resource blocks may be defined in each slot. Each resource block may cover 12 subcarriers in one slot and may include a number of resource elements. Each resource element may cover one subcarrier in one symbol period and may be used to send one modulation symbol, which may be a real or complex value. The available resource blocks in each slot may be assigned to UEs for transmission on the uplink.

FIG. 2 also shows an exemplary uplink transmission on a Physical Uplink Shared Channel (PUSCH) in two slots of one subframe. The two slots include 14 symbol periods with indices of 0 through 13 for the normal cyclic prefix. A UE may be assigned M subcarriers for transmission, where M may be an integer multiple of 12, which is the number of subcarriers for one resource block. The UE may transmit a SC-FDMA symbol carrying data on the M assigned subcarriers in each symbol period of the subframe except for symbol periods 3 and 10. The UE may transmit a SC-FDMA symbol carrying a demodulation reference signal (DMRS) on the M assigned subcarriers in each of symbol periods 3 and 10. A reference signal is a signal that is known a priori by a transmitter and a receiver and may also be referred to as pilot, preamble, reference, training sequence, etc. A DMRS is a reference signal that is transmitted by a UE and may be used by an eNB for channel estimation and data/coherent demodulation.

For the extended cyclic prefix, the two slots of one subframe include 12 symbol periods with indices of 0 through 11. The UE may transmit a SC-FDMA symbol carrying data on M assigned subcarriers in each symbol period of the subframe except for symbol periods 2 and 8. The UE may transmit a SC-FDMA symbol carrying a DMRS on the M assigned subcarriers in each of symbol periods 2 and 8.

As shown in FIG. 2, a DMRS may be transmitted in one SC-FDMA symbol in each slot. The overhead for the DMRS may then be approximately 14% (or one out of seven SC-FDMA symbols) with the normal cyclic prefix or approximately 17% (or one out of six SC-FDMA symbols) with the extended cyclic prefix. It may be desirable to reduce the overhead due to the DMRS and/or to transmit the DMRS such that improved channel estimation performance can be obtained.

In an aspect, DMRS and data may be multiplexed and transmitted on different sets of subcarriers in the same symbol period using FDM. In particular, the DMRS may be transmitted on a subset of M subcarriers assigned to a UE for transmission. Data may be transmitted on the remaining subcarriers not used for the DMRS. The DMRS and data may be flexibly multiplexed based on a tradeoff between DMRS overhead, channel estimation performance, data throughput, etc.

The DMRS and data may be FDMed in various manners. In one design, the DMRS may be transmitted on one subcarrier out of every S subcarriers, where S may be any integer value greater than one. This design results in the DMRS being transmitted on evenly spaced subcarriers occupying a comb-like structure. Data may be transmitted on the remaining subcarriers that are not used for the DMRS. In one design, S may be a fixed value and may be selected based on a tradeoff between DMRS overhead and channel estimation performance. In another design, S may be a configurable value and may be selected based on channel conditions, the desired DMRS overhead, the desired performance, etc. The DMRS and data may also be multiplexed in other manners.

For clarity, much of the description below assumes that a UE is assigned M subcarriers. The UE may transmit the DMRS on P pilot subcarriers, which are subcarriers used to transmit the DMRS. The pilot subcarriers may be spaced apart by S subcarriers. For simplicity, S may be an integer divisor of M, so that M=S*P. The UE may transmit data on the remaining D data subcarriers, which are subcarriers used to transmit data. The data subcarriers may include S−1 subcarriers out of every S subcarriers. The number of data subcarriers may be given as D=(S−1)*P, and the number of assigned subcarriers may be given as M=P+D.

Figure 3:
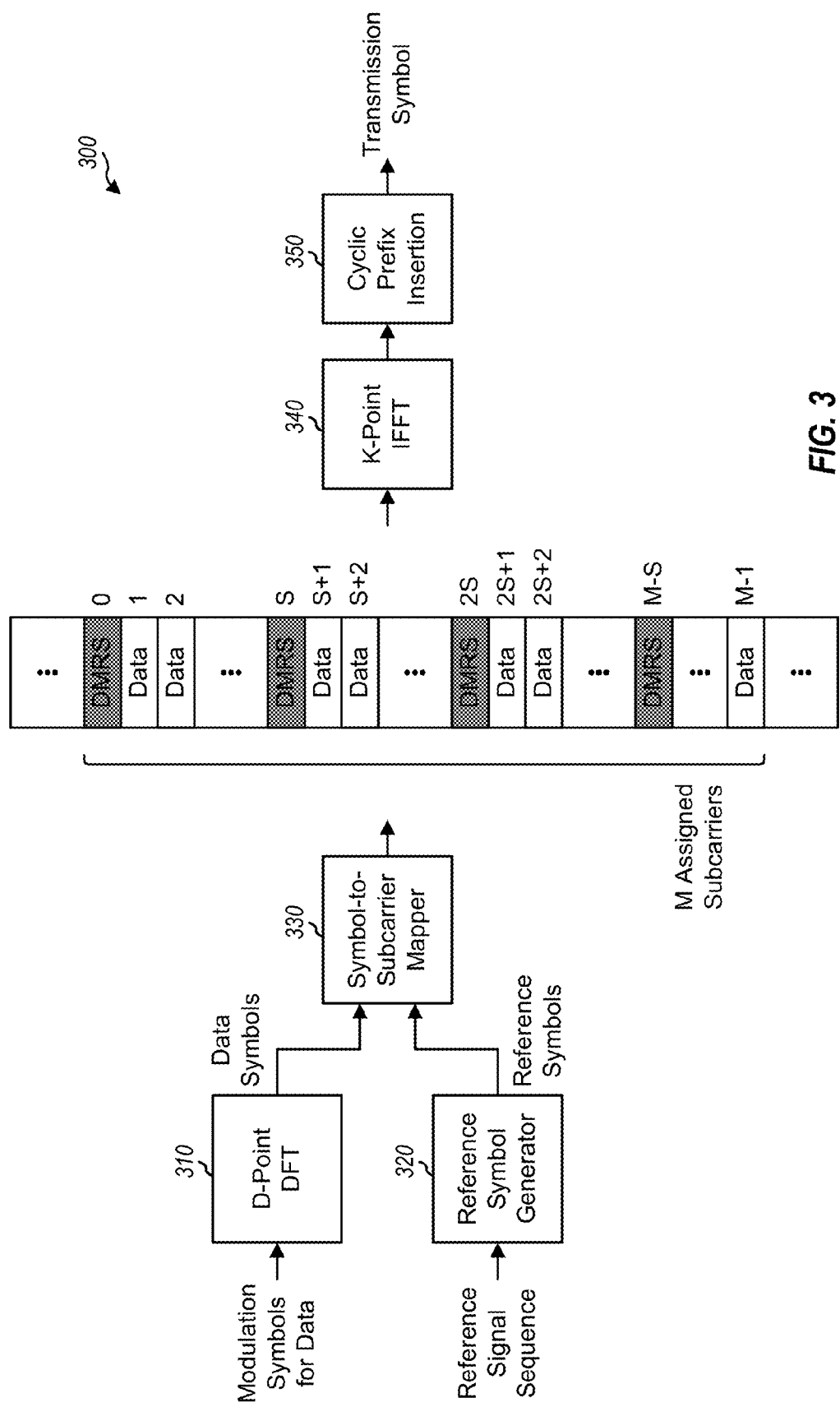
FIG. 3 shows a block diagram of a transmitter module.

FIG. 3 shows a block diagram of a design of a transmitter module 300 for a UE. Module 300 can multiplex the DMRS and data on different sets of pilot and data subcarriers in one symbol period. Within module 300, a DFT unit 310 may receive D modulation symbols for data (e.g., traffic data and/or control data), perform a D-point DFT on the D modulation symbols, and provide D frequency-domain data symbols. A generator 320 may receive a reference signal (RS) sequence assigned to the UE for the DMRS and may generate P reference symbols based on the RS sequence. A symbol-to-subcarrier mapper 330 may receive the D data symbols from DFT unit 310 and the P reference symbols from generator 320. Mapper 330 may map the P reference symbols to the P pilot subcarriers and may map the D data symbols to the D data subcarriers. In the example shown in FIG. 3, the M subcarriers may be assigned indices of 0 through M−1, the reference symbols may be mapped to subcarriers 0, S, 2S, etc., and the data symbols may be mapped to the remaining subcarriers. In general, the pilot subcarriers may include subcarriers O, S+O, 2S+O, . . . , where O denotes an offset that may be given as 0≤O<S.

Mapper 330 may also map zero symbols with signal value of zero to the remaining K−M subcarriers not assigned to the UE and may provide K mapped symbols for the K total subcarriers. An inverse fast Fourier transform (IFFT) unit 340 may perform a K-point IFFT on the K mapped symbols and may provide K time-domain samples for a useful portion. A cyclic prefix insertion unit 350 may copy the last G time-domain samples of the useful portion, append the G copied samples to the front of the useful portion, and provide a transmission symbol comprising K+G time-domain samples. The copied samples are referred to as a cyclic prefix and are used to combat frequency selective fading. In general, a transmission symbol may be a SC-FDMA symbol, an OFDM symbol, an interleaved frequency division multiplex (IFDM) symbol, a localized frequency division multiplexing (LFDM) symbol, etc.

In the design shown in FIG. 3, the data symbols may be DFT precoded (or passed through a DFT) prior to mapping to the data subcarriers in order to obtain a lower cubic metric. A cubic metric is indicative of an amount of distortion in a signal. The distortion may necessitate a reduction in power capability (or power de-rating) of a power amplifier at a UE. A lower cubic metric may enable the power amplifier to be operated with a lower backoff and hence provide higher output power, which may be desirable. Since units 330, 340 and 350 are part of a conventional OFDM modulator, the data may be deemed to be transmitted using DFT-precoded OFDM in FIG. 3. DFT-precoded OFDM may also be considered as a form of SC-FDMA.

In another design, the modulation symbols for data may be mapped directly to the data subcarriers (without first going through a DFT). In this design, data may be transmitted using OFDM. Data may also be multiplexed with the DMRS and transmitted in other manners.

In the design shown in FIG. 3, the DMRS may be transmitted using OFDM, and the reference symbols may be mapped directly to the pilot subcarriers (without first going through a DFT). In another design, the DMRS may be transmitted using IFDM. In this design, the reference symbols may be passed through a P-point DFT to obtain P frequency-domain symbols, which may then be mapped to the P pilot subcarriers. The DMRS may also be transmitted in other manners.

The reference symbols for the DMRS may be generated in various manners. In one design, the reference symbols may be generated based on a RS sequence having good correlation properties, e.g., as shown in FIG. 3. In one design, a base sequence having good correlation properties may be used to generate a set of RS sequences. The base sequence may be a CAZAC (constant amplitude zero auto correlation) sequence having a flat spectral response and zero auto-correlation. Zero auto-correlation means that the correlation of the CAZAC sequence with itself results in a large value at zero offset and small (or zero) values at all other offsets. The zero auto-correlation property is beneficial for accurate detection of the CAZAC sequence. Some exemplary CAZAC sequences include a Zadoff-Chu sequence, a Chu sequence, a Frank sequence, a generalized chirp-like (GCL) sequence, etc. The base sequence may also be a computer-generated sequence having good correlation properties (e.g., CAZAC properties).

A set of RS sequences may be defined by cyclically shifting the base sequence r(n) by different amounts in the time domain, as follows:

$$r_p(n) = r((n + p) \bmod P) \text{ in time domain for } p = 0, \ldots, P-1, \quad \text{Eq (1)}$$

$$R_p(k) = R(k) \cdot e^{j\frac{2\pi kp}{P}} \text{ in frequency domain} \quad \text{Eq (2)}$$

where $r_p(n)$ is a time-domain RS sequence with a cyclic shift of p,
$R(k)$ is DFT of $r(n)$,
$R_p(k)$ is a frequency-domain RS sequence with a cyclic shift of p, and
"mod" denotes a modulo operation.

As shown in equation (1), up to P RS sequences may be defined with up to P different cyclic shifts of the base sequence of length P in the time domain. A cyclic shift in the time domain is equivalent to applying a phase ramp in the frequency domain, as shown in equation (2). For clarity, much of the description below refers to time-domain RS sequences. One RS sequence may be assigned to a UE and used to generate the reference symbols. The RS sequence may have a length of M and may include M reference symbols if the DMRS is transmitted on all M subcarriers assigned to the UE, e.g., as shown in FIG. 2. However, if the DMRS is transmitted on every S-th subcarrier as shown in FIG. 3, then the RS sequence may have a length of P and may include P reference symbols for the P pilot subcarriers. In general, the RS sequence may be defined to have a length matching the number of pilot subcarriers used for the DMRS.

For the design shown in FIG. 3, the overhead due to the DMRS may be reduced by a factor of S since the DMRS is transmitted on every S-th subcarrier instead of every subcarrier. Hence, the overhead due to the DMRS may be reduced to (14/S) % for the normal cyclic prefix or (17/S) % for the extended cyclic prefix. As an example, for a spacing of S=2 subcarriers between pilot subcarriers, the DMRS overhead may be reduced by 50% from approximately 14% to approximately 7% for the normal cyclic prefix.

Figure 4:
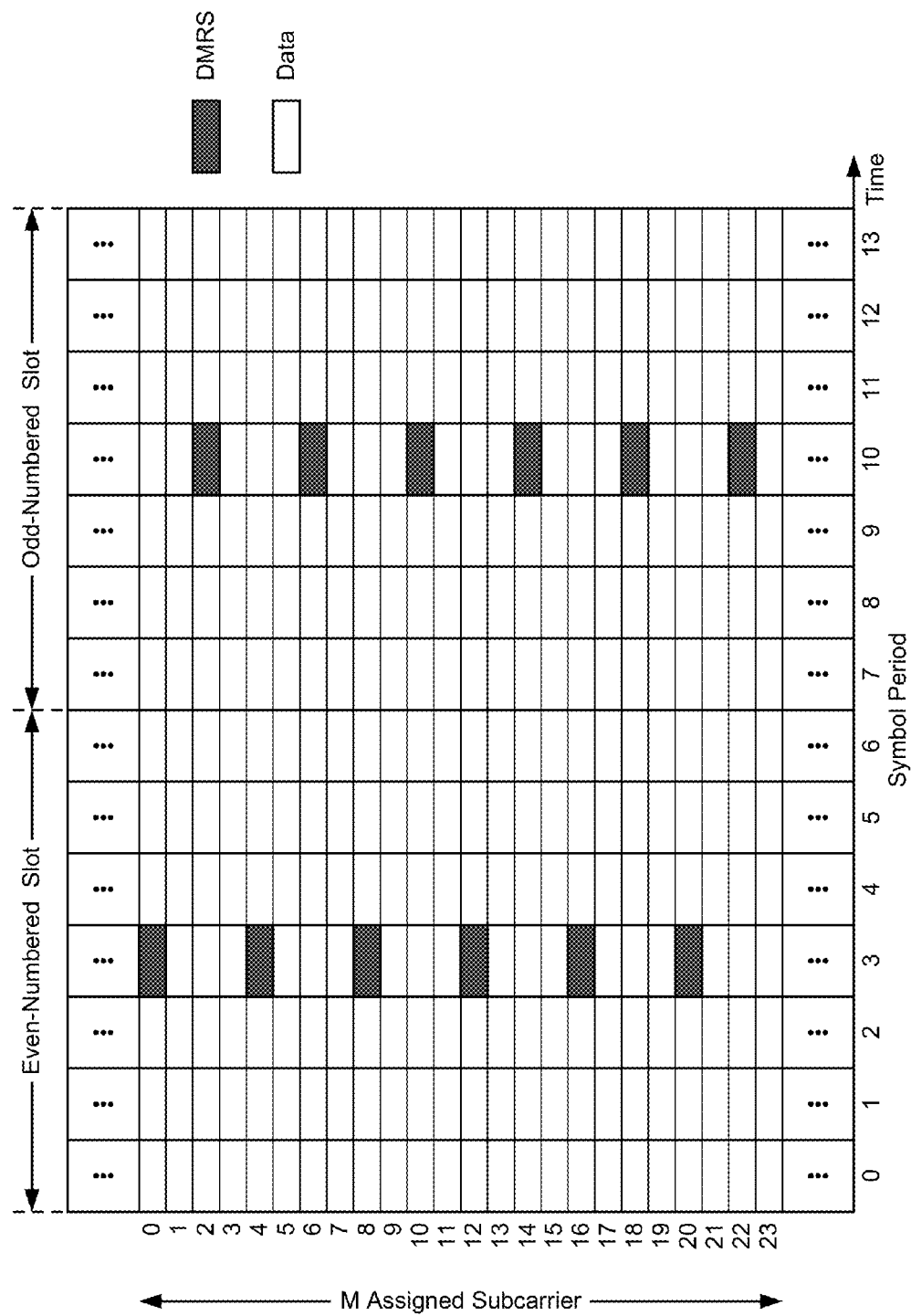
FIG. 4 shows transmission of DMRS on staggered pilot subcarriers.

FIG. 4 shows a design of transmitting the DMRS on staggered pilot subcarriers in two slots of one subframe. In the example shown in FIG. 4, a UE is assigned M=24 subcarriers, the DMRS is transmitted on P=6 pilot subcarriers in one symbol period, and the pilot subcarriers are spaced apart by S=4 subcarriers. The UE may transmit the DMRS and data in each of symbol periods 3 and 10 for the regular cyclic prefix. The UE may transmit the DMRS on subcarriers 0, 4, 8, 12, 16 and 20 in symbol period 3 and on subcarriers 2, 6, 10, 14, 18 and 22 in symbol period 10. The pilot subcarriers in symbol period 10 may thus be staggered with respect to the pilot subcarriers in symbol period 3. Staggering the pilot symbols may enable an eNB to obtain a denser channel observation in frequency and to estimate channel gains for more subcarriers, which may improve performance.

In the design shown in FIG. 4, the DMRS is transmitted in one symbol period in each slot. This design may provide good channel estimation performance for a stationary or low mobility UE. It may be desirable to transmit the DMRS in more symbol periods of each slot in order to obtain good channel estimation performance for a high mobility UE.

Figure 5A:
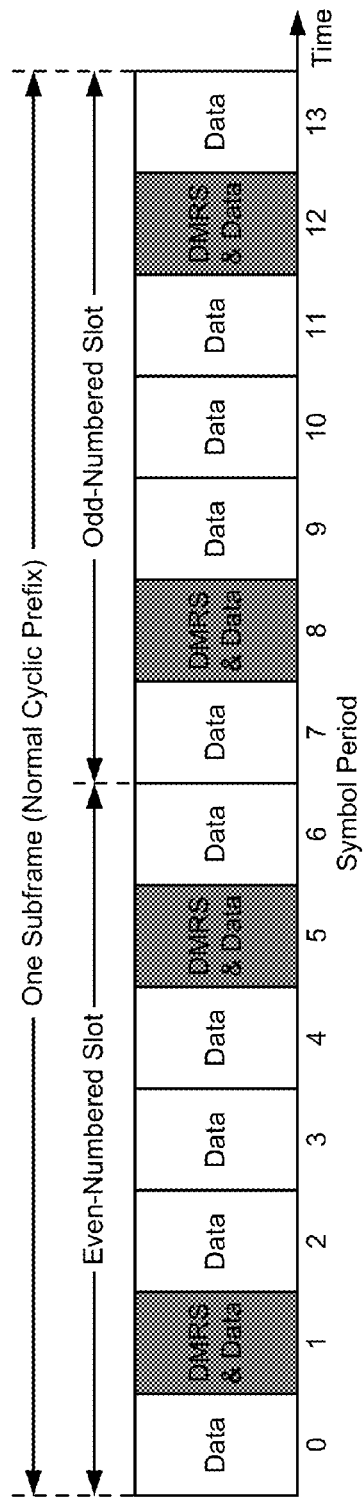
FIGS. 5A and 5B show transmission of DMRS and data in two symbol periods of each slot with a normal cyclic prefix and an extended cyclic prefix, respectively.

FIG. 5A shows a design of transmitting the DMRS and data in two symbol periods of each slot of a subframe with the normal cyclic prefix. In the design shown in FIG. 5A, the DMRS and data may be multiplexed on different subcarriers and transmitted in the second symbol period (e.g., symbol periods 1 and 8) and also the second to last symbol period (e.g., symbol periods 5 and 12) of each slot.

Figure 5B:
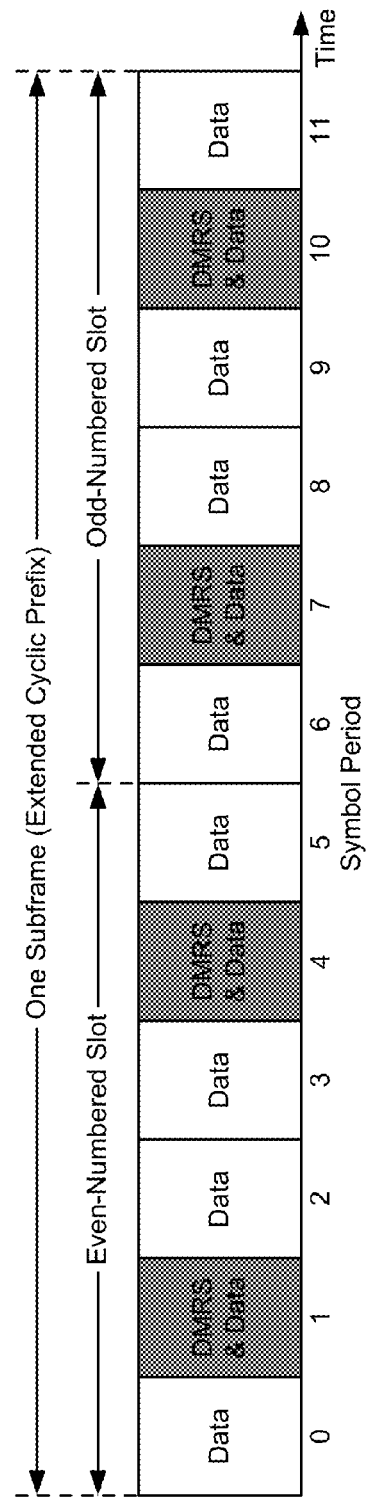

FIG. 5B shows a design of transmitting the DMRS and data in two symbol periods of each slot of a subframe with the extended cyclic prefix. In the design shown in FIG. 5B, the DMRS and data may be multiplexed on different subcarriers and transmitted in the second symbol period (e.g., symbol periods 1 and 7) and also the second to last symbol period (e.g., symbol periods 4 and 10) of each slot.

FIGS. 5A and 5B show exemplary designs of transmitting the DMRS and data in two symbol periods of each slot. In general, the DMRS and data may be transmitted in any number of symbol periods of a slot (or a subframe) and also in any symbol period of the slot (or subframe). The number of symbol periods in which to transmit the DMRS may be selected based on the UE mobility, the desired DMRS overhead, the desired performance, etc. The DMRS may be transmitted in more symbol periods for greater UE mobility, which may enable an eNB to have more channel observations per slot in time to enable reliable channel estimation in the presence of high Doppler due to UE mobility.

For the designs shown in FIGS. 5A and 5B, the overhead due to the DMRS may be (28/S) % for the normal cyclic prefix or (34/S) % for the extended cyclic prefix. As an example, for a spacing of S=2 subcarriers between pilot subcarriers, the DMRS overhead may be approximately 14% for the normal cyclic prefix or 17% for the extended cyclic prefix. This amount of DMRS overhead may be similar to the overhead for the design shown in FIG. 2 and may thus be acceptable.

The system may support uplink transmission from multiple antennas at a UE. In this case, it may be desirable to transmit the DMRS from each antenna at the UE to enable an eNB to estimate the channel response for each antenna at the UE. The DMRS may be multiplexed with data and transmitted from multiple antennas at the UE in various manners.

In a first design, a UE may transmit the DMRS from multiple (T) antennas with FDM. The UE may transmit the DMRS from each antenna on a set of P pilot subcarriers, which may include one subcarrier out of every S subcarriers (similar to the case with one antenna). S may be a fixed value or a configurable value and may be selected based on the channel conditions, the desired DMRS overhead, the desired channel estimation performance, and/or other criteria. The UE may transmit the DMRS from the T antennas on different sets of P pilot subcarriers. T subcarriers out of every S subcarriers, and a total of T*P pilot subcarriers, may be used for the DMRS for all T antennas. The UE may avoid transmitting data on the pilot subcarriers for all antennas in order to avoid interference from data to the DMRS. Hence, data may be transmitted on S−T subcarriers out of every S subcarriers.

Figure 6:
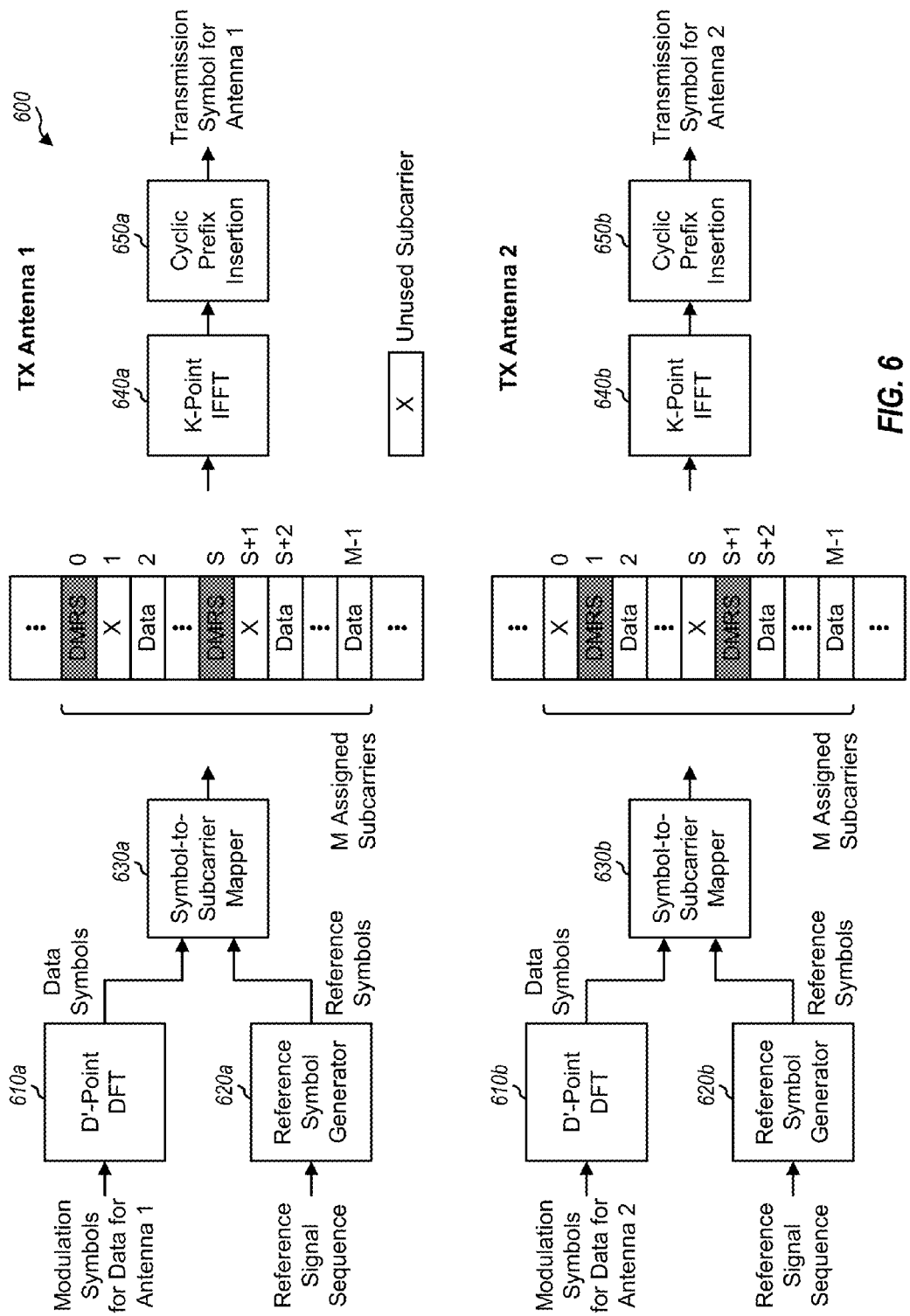
FIGS. 6 and 7 show block diagrams of transmitter modules for transmitting DMRS from multiple antennas with FDM and CDM, respectively.

FIG. 6 shows a block diagram of a design of a transmitter module 600, which can transmit the DMRS from two antennas at a UE with FDM. In this design, the DMRS may be transmitted (i) from a first antenna (TX antenna 1) on a first set of P pilot subcarriers, which may include subcarriers 0, S, 2S, etc., and (ii) from a second antenna (TX antenna 2) on a second set of P pilot subcarriers, which may include subcarriers 1, S+1, 2S+1, etc. Data may be transmitted from each antenna on the same D' data subcarriers, where D'=M−2P.

Within module 600, for the first antenna, a DFT unit 610a may receive D' modulation symbols for data to be transmitted from the first antenna, perform a D'-point DFT on these D' modulation symbols, and provide D' frequency-domain data symbols. A generator 620a may receive a RS sequence assigned to the UE for the DMRS and may generate P reference symbols based on the RS sequence. A symbol-to-subcarrier mapper 630a may receive the D' data symbols from DFT unit 610a and the P reference symbols from generator 620a. Mapper 630a may map the P reference symbols to the P pilot subcarriers for the first antenna, map the D' data symbols to the D' data subcarriers, map zero symbols to the remaining subcarriers (including the P pilot subcarriers for the second antenna), and provide K mapped symbols for the K total subcarriers. An IFFT unit 640a may perform a K-point IFFT on the K mapped symbols and provide K time-domain samples for a useful portion. A cyclic prefix insertion unit 650a may append a cyclic prefix to the useful portion and provide a transmission symbol comprising K+G time-domain samples for the first antenna.

For the second antenna, a DFT unit 610b may receive D' modulation symbols for data to be transmitted from the second antenna, perform a D'-point DFT on these D' modulation symbols, and provide D' frequency-domain data symbols. A generator 620b may receive the RS sequence assigned to the UE for the DMRS and may generate P reference symbols based on the RS sequence. A symbol-to-subcarrier mapper 630b may receive the D' data symbols from DFT unit 610b and the P reference symbols from generator 620b. Mapper 630b may map the P reference symbols to the P pilot subcarriers for the second antenna, map the D' data symbols to the D' data subcarriers, map zero symbols to the remaining subcarriers (including the P pilot subcarriers for the first antenna), and provide K mapped symbols for the K total subcarriers. An IFFT unit 640b may perform a K-point IFFT on the K mapped symbols and provide K time-domain samples for a useful portion. A cyclic prefix insertion unit 650b may append a cyclic prefix to the useful portion and provide a transmission symbol comprising K+G time-domain samples for the second antenna.

As shown in FIG. 6, for each antenna, the DMRS and data may be frequency division multiplexed and transmitted on different sets of data and pilot subcarriers. As also shown in FIG. 6, the DMRS for the two antennas may be frequency division multiplexed and transmitted on different sets of pilot subcarriers. The design shown in FIG. 6 may be extended to any number of antennas.

In a second design, a UE may transmit the DMRS from multiple (T) antennas with CDM. The UE may transmit the DMRS from each antenna on a set of P pilot subcarriers, which may include one subcarrier out of every S subcarriers (similar to the case with one antenna). S may be a fixed value or a configurable value. The UE may transmit the DMRS from the T antennas on the same set of P pilot subcarriers.

Hence, only one subcarrier out of every S subcarriers may be used for the DMRS for all T antennas. However, the UE may use different RS sequences for the T antennas to enable an eNB to distinguish the DMRS from each antenna. The UE may transmit data on S−1 subcarriers out of every S subcarriers.

Figure 7:
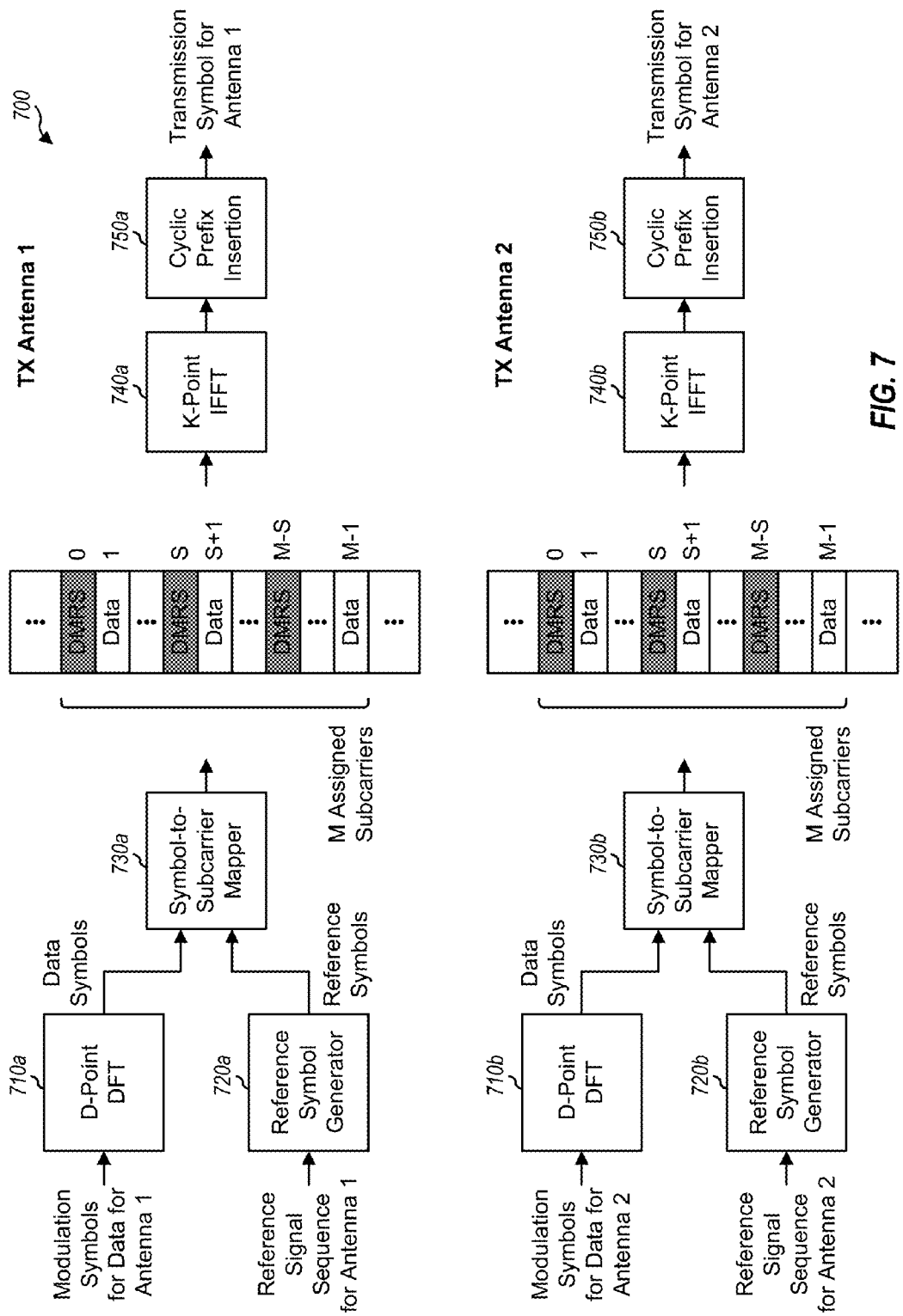

FIG. 7 shows a block diagram of a design of a transmitter module 700, which can transmit the DMRS from two antennas at a UE with CDM. In this design, the DMRS may be transmitted (i) from a first antenna (TX antenna 1) on a set of P pilot subcarriers, which may include subcarriers 0, S, 2S, etc., and (ii) from a second antenna (TX antenna 2) on the same set of P pilot subcarriers. Data may be transmitted from each antenna on the same D data subcarriers, where D=M−P.

Within module 700, for the first antenna, a DFT unit 710a may receive D modulation symbols for data to be transmitted from the first antenna, perform a D-point DFT on these D modulation symbols, and provide D frequency-domain data symbols. A generator 720a may receive a RS sequence assigned to the UE for the DMRS for the first antenna and may generate P reference symbols based on the RS sequence. A symbol-to-subcarrier mapper 730a may receive the D data symbols from DFT unit 710a and the P reference symbols from generator 720a. Mapper 730a may map the P reference symbols to the P pilot subcarriers, map the D data symbols to the D data subcarriers, map zero symbols to the remaining subcarriers, and provide K mapped symbols for the K total subcarriers. An IFFT unit 740a may perform a K-point IFFT on the K mapped symbols and provide K time-domain samples for a useful portion. A cyclic prefix insertion unit 750a may append a cyclic prefix to the useful portion and provide a transmission symbol comprising K+G time-domain samples for the first antenna.

For the second antenna, a DFT unit 710b may receive D modulation symbols for data to be transmitted from the second antenna, perform a D-point DFT on these D modulation symbols, and provide D frequency-domain data symbols. A generator 720b may receive a RS sequence assigned to the UE for the DMRS for the second antenna and may generate P reference symbols based on the RS sequence. A symbol-to-subcarrier mapper 730b may receive the D data symbols from DFT unit 710b and the P reference symbols from generator 720b. Mapper 730b may map the P reference symbols to the P pilot subcarriers, map the D data symbols to the D data subcarriers, map zero symbols to the remaining subcarriers, and provide K mapped symbols for the K total subcarriers. An IFFT unit 740b may perform a K-point IFFT on the K mapped symbols and provide K time-domain samples for a useful portion. A cyclic prefix insertion unit 750b may append a cyclic prefix to the useful portion and provide a transmission symbol comprising K+G time-domain samples for the second antenna.

As shown in FIG. 7, for each antenna, the DMRS and data may be FDMed and transmitted on different sets of data and pilot subcarriers. As also shown in FIG. 7, the DMRS for the two antennas may be transmitted on the same set of pilot subcarriers with CDM. The design shown in FIG. 7 may be extended to any number of antennas.

In the designs shown in FIGS. 6 and 7, the data symbols may be DFT precoded prior to mapping to the data subcarriers in order to obtain a lower cubic metric. In another design, the modulation symbols for data may be mapped directly to the data subcarriers (without going through a DFT unit).

In one design, the reference symbols for each antenna may be generated based on an RS sequence, which may be a cyclic shift of a base sequence having good correlation properties, as described above. In the design shown in FIG. 6, the same RS sequence or different RS sequences may be used for the two antennas. In the design shown in FIG. 7, different RS sequences may be used for the two antennas and may be different cyclic shifts of the same base sequence. The amount of relative cyclic shift for the two antennas should be larger than an expected delay spread of a wireless channel for the UE. The reference symbols for each antenna may also be generated in other manners to obtain good performance.

For clarity, the techniques for multiplexing reference signal and data have been described specifically for the DMRS transmitted on the uplink by a UE to aid data demodulation by an eNB. The techniques may also be used for other types of reference signals.

In one design, the techniques may be used to multiplex a sounding reference signal (SRS) with data. In LTE, a UE may be configured to transmit a SRS in certain reserved symbol periods, which may be the last symbol period of certain subframes. The UE may also be configured to transmit the SRS on all or part of the system bandwidth and possibly on different parts of the system bandwidth in different symbol periods.

In one design, the UE may be configured to transmit the SRS on a set of sounding subcarriers, which may be subcarriers used to transmit the SRS. The sounding subcarriers may include one subcarrier out of every L-th subcarriers, where L may be a configurable value greater than one. In one design, the UE may frequency division multiplex the SRS with data and may transmit data on some or all subcarriers not used to transmit the SRS, e.g., as shown in FIG. 3.

Different UEs may be multiplexed in various manners for the SRS. In one design, different UEs may be FDMed and assigned different sets of sounding subcarriers to transmit their SRS. Each UE may transmit its SRS on its set of sounding subcarriers and may transmit data on other subcarriers, e.g., subcarriers not used for the SRS by any UE. In another design, different UEs may be CDMed and assigned the same set of sounding subcarriers but different SRS sequences to transmit their SRS. The SRS sequences may be defined in various manners to have good correlation properties. For example, the SRS sequences may be generated based on different cyclic shifts of the same base sequence and may enable an eNB to detect the SRS from each UE. In yet another design, different UEs may be time division multiplexed and assigned the same set of sounding subcarriers but different symbol periods to transmit their SRS. Different UEs may also be multiplexed in other manners for the SRS.

Figure 8:
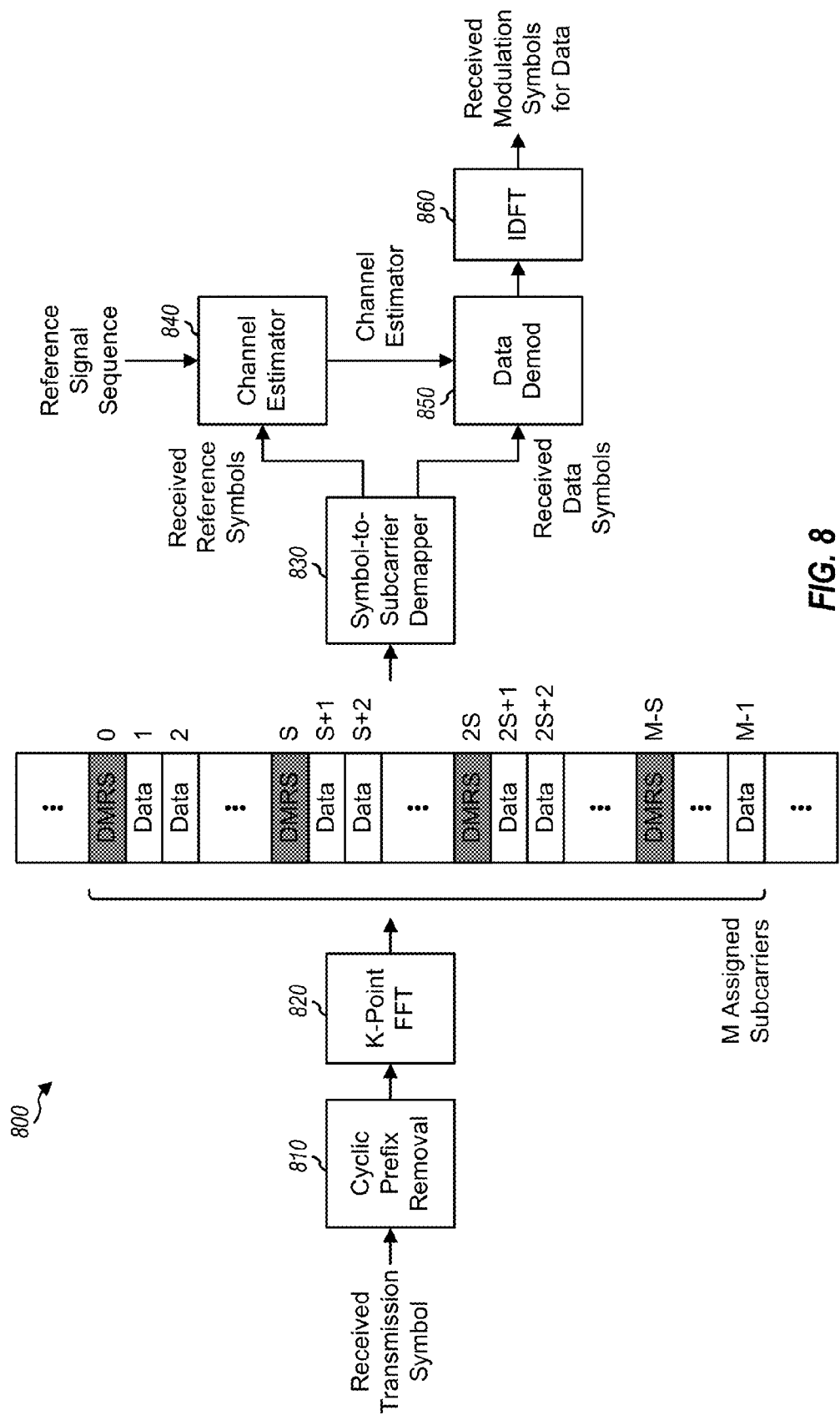
FIG. 8 shows a block diagram of a receiver module.

FIG. 8 shows a block diagram of a design of a receiver module 800 for an eNB. Module 800 may be used to process a transmission sent by a UE based on transmitter module 300 in FIG. 3. Within module 800, a cyclic prefix removal unit 810 may obtain a received transmission symbol comprising K+G time-domain samples. Unit 810 may remove G time-domain samples corresponding to a cyclic prefix and may provide K time-domain samples corresponding to a useful portion. A fast Fourier transform (FFT) unit 820 may perform a K-point FFT on the K time-domain samples and provide K received symbols for the K total subcarriers.

A symbol-to-subcarrier demapper 830 may obtain the K received symbols for the K total subcarriers, provide P received reference symbols from the P pilot subcarriers to a channel estimator 840, and provide D received data symbols from the D data subcarriers to a data demodulator (Demod) 850. Channel estimator 840 may derive a channel estimate (e.g., channel gains) for M subcarriers assigned to the UE. Data demodulator 850 may perform data demodulation (e.g., coherent detection) on the D received data symbols with the channel estimate and provide D demodulated data symbols.

An IDFT unit 860 may perform a D-point IDFT on the D demodulated data symbols and provide D received modulation symbols for data. The received modulation symbols may be further processed (e.g., symbol demapped and decoded) to recover the data transmitted on the data subcarriers.

FIG. 8 shows a design of processing a received transmission symbol sent from one antenna at the UE. The received transmission symbol may also be processed in other manners. For example, channel estimation and data demodulation may be performed in the time domain (instead of in the frequency domain as shown in FIG. 8).

Channel estimation and data demodulation may also be performed in other manners when DMRS and data are transmitted via multiple antennas at the UE. For example, a channel estimate may be derived for each antenna based on reference symbols transmitted from that antenna. Data demodulation may be performed (i) separately for each antenna or (ii) jointly for all antennas, e.g., using minimum mean square error (MMSE) or some other multiple-input-multiple-output (MIMO) detection scheme.

The techniques described herein may provide various advantages. First, the techniques may enable reduction of overhead for reference signals such as the DMRS, the SRS, etc. For example, fewer pilot subcarriers may be used for the DMRS, and overhead may be reduced in certain operating scenarios such as when a transmission rank is low (e.g., rank-1 beamforming) and signal-to-noise-and-interference ratio (SINR) is high. DMRS overhead may be flexibly adjusted by selecting a suitable value of S. Second, the techniques may enable reference signals to be transmitted more often in time (e.g., denser DMRS in time) while maintaining reasonable overhead for the reference signals. Transmitting the DMRS in one symbol period per slot (e.g., as shown in FIG. 2) may not be sufficiently dense in time to support reliable channel estimation at higher Doppler frequencies due to UE mobility (e.g., when a UE moves at a speed of 350 km/hr with a carrier frequency of 2.6 GHz). In such a high mobility scenario, the DMRS may be transmitted more frequently in time (e.g., in two symbol periods of each slot as shown in FIG. 5) but on fewer subcarriers per symbol period in order to maintain the DMRS overhead at a reasonable level. For example, the DMRS overhead for denser DMRS in time may be maintained equal to or less than the DMRS overhead for the case in which the DMRS is transmitted on all M subcarriers in one symbol period of each slot. This may be achieved by selecting the pilot subcarrier spacing S to be equal to or greater than the number of symbol periods in which the DMRS is transmitted in each slot.

FIG. 9 shows a design of a process 900 for transmitting one or more reference signals and data. Process 900 may be performed by a UE (as described below) or by some other entity. The UE may perform a DFT on a set of modulation symbols for data to obtain data symbols (block 912). The UE may obtain reference symbols, which may be generated based on a reference signal sequence corresponding to a cyclic shift of a base sequence (block 914). The UE may map the reference symbols to a first set of subcarriers in a symbol period (block 916). The UE may map the data symbols to a second set of subcarriers in the symbol period (block 918). The UE may generate a transmission symbol (e.g., a SC-FDMA symbol, an OFDM symbol, etc.) based on the mapped reference symbols and the mapped data symbols (block 920). The UE may transmit the transmission symbol via an antenna at the UE (block 922).

The reference signal sequence may have a length of P and may include P reference symbols, where P is the number of subcarriers in the first set of subcarriers. The base sequence may comprise a Zadoff-Chu sequence, or a computer-generated sequence, or some other sequence having good correlation properties. The reference symbols may be for a DMRS used to demodulate the data symbols or some other reference signal. The reference symbols may be generated once and stored for later use or may be generated on the fly as needed.

In one design, the UE may receive an assignment of M subcarriers. The first set of subcarriers may include one subcarrier out of every S subcarriers among the M subcarriers, where M is greater than S, and S is greater than one. S may be a fixed value or a configurable value. The first set of subcarriers may include evenly spaced subcarriers among the M subcarriers. The second set of subcarriers may include at least one subcarrier (e.g., all subcarriers) among the M subcarriers but may exclude subcarriers used to transmit reference symbols.

In one design, the UE may transmit reference signals in multiple symbol periods, e.g., as shown in FIG. 4, 5A or 5B. The UE may map second reference symbols to a third set of subcarriers in a second symbol period. The UE may map second data symbols to a fourth set of subcarriers in the second symbol period. The UE may generate a second transmission symbol based on the mapped second reference symbols and the mapped second data symbols. The symbol period and the second symbol period may correspond to two symbol periods of a slot (e.g., as shown in FIG. 5A or 5B) or a subframe (e.g., as shown in FIG. 4). The first and third sets may include the same number of subcarriers. In one design, the third set of subcarriers may be the same as the first set of subcarriers. In another design, the third set of subcarriers may be staggered with respect to the first set of subcarriers (e.g., as shown in FIG. 4).

In one design, the UE may transmit reference signals from multiple antennas, e.g., as shown in FIG. 6 or 7. The UE may map second reference symbols to a third set of subcarriers in the symbol period. The UE may also map second data symbols to a fourth set of subcarriers in the symbol period. The UE may generate a second transmission symbol based on the mapped second reference symbols and the mapped second data symbols. The UE may transmit the second transmission symbol via a second antenna in the same symbol period. In one design, reference signals for the two antennas may be frequency division multiplexed (e.g., as shown in FIG. 6). In this design, the third set of subcarriers may include subcarriers not included in the first set of subcarriers. In another design, reference signals for the two antennas may be code division multiplexed (e.g., as shown in FIG. 7). In this design, the second reference symbols may be generated based on a second reference signal sequence corresponding to a second cyclic shift of the base sequence. The first set of subcarriers may be the same as the third set of subcarriers. In one design, the second set of subcarriers may be the same as the fourth set of subcarriers, and the second and fourth sets may each include at least one subcarrier (e.g., all subcarriers) among the M subcarriers assigned to the UE but may exclude subcarriers used to transmit reference symbols.

In general, the UE may transmit reference signals from any number of antennas and in any number of symbol periods of a slot or a subframe. The UE may generate reference signals for all antennas in each symbol period based on FDM, CDM, etc. The UE may use the same pilot subcarriers for all symbol periods or different pilot subcarriers in different symbol periods.

FIG. 10 shows a design of a process 1000 for receiving one or more reference signals and data. Process 1000 may be performed by a base station/eNB (as described below) or by some other entity. The base station may receive a transmission symbol (e.g., a SC-FDMA symbol, an OFDM symbol, etc.) in a symbol period, with the transmission symbol comprising reference symbols mapped to a first set of subcarriers and data symbols mapped to a second set of subcarriers (block 1012). The reference symbols may be generated based on a reference signal sequence corresponding to a cyclic shift of a base sequence. The base station may process the received transmission symbol to obtain received reference symbols from the first set of subcarriers and received data symbols from the second set of subcarriers (block 1014). The base station may process the received reference symbols to obtain a channel estimate (block 1016). The base station may process the received data symbols based on the channel estimate to obtain demodulated data symbols (block 1018). In one design, data may be transmitted with DFT precoding. In this case, the base station may perform an IDFT on the demodulated data symbols to obtain received modulation symbols (block 1020). The base station may further process the received modulation symbols to recover data transmitted on the second set of subcarriers (block 1022).

The base station may send an assignment of M subcarriers to a UE. The first set of subcarriers may include one subcarrier out of every S subcarriers among the M subcarriers, where M is greater than S, and S is greater than one. The second set of subcarriers may include at least one subcarrier (all subcarriers) among the M subcarriers but may exclude subcarriers used to transmit reference symbols.

In one design, reference signals may be transmitted in multiple symbol periods. The base station may receive a second transmission symbol in a second symbol period, with the second transmission symbol comprising second reference symbols mapped to a third set of subcarriers and second data symbols mapped to a fourth set of subcarriers. The base station may process the received second transmission symbol to obtain received second reference symbols from the third set of subcarriers and received second data symbols from the fourth set of subcarriers. The base station may process the received second reference symbols to obtain a second channel estimate. The base station may then process the received second data symbols based on the second channel estimate to obtain demodulated second data symbols. The symbol period and the second symbol period may correspond to two symbol periods of a slot (e.g., as shown in FIG. 5A or 5B) or a subframe (e.g., as shown in FIG. 4). The third set of subcarriers may be (i) the same as the first set of subcarriers or (ii) staggered with respect to the first set of subcarriers.

In another design, reference signals may be transmitted from multiple antennas at the UE. The base station may receive a second transmission symbol in the same symbol period, with the second transmission symbol comprising second reference symbols mapped to a third set of subcarriers and second data symbols mapped to a fourth set of subcarriers. The transmission symbol may be sent via a first antenna, and the second transmission symbol may be sent via a second antenna at the UE. The base station may process the received second transmission symbol to obtain received second reference symbols from the third set of subcarriers and received second data symbols from the fourth set of subcarriers. The base station may process the received second reference symbols to obtain a second channel estimate for the second antenna. The base station may then process all received data symbols based on the channel estimates to obtain demodulated data symbols for all antennas.

In one design, the reference signals for the two antennas at the UE may be frequency division multiplexed. In this design, the third set of subcarriers may include subcarriers not included in the first set of subcarriers. In another design, the reference signals for the two antennas at the UE may be code division multiplexed. In this design, the second reference symbols may be generated based on a second reference signal sequence corresponding to a second cyclic shift of the base sequence. The third set of subcarriers may be the same as the first set of subcarriers.

In general, reference signals may be transmitted from any number of antennas at the UE and in any number of symbol periods of a slot or a subframe. The base station may derive a channel estimate for each antenna based on the reference symbols transmitted via that antenna. The base station may perform data demodulation for the received data symbols for each antenna separately or may perform data demodulation/MIMO detection for all antennas jointly.

Figure 11:
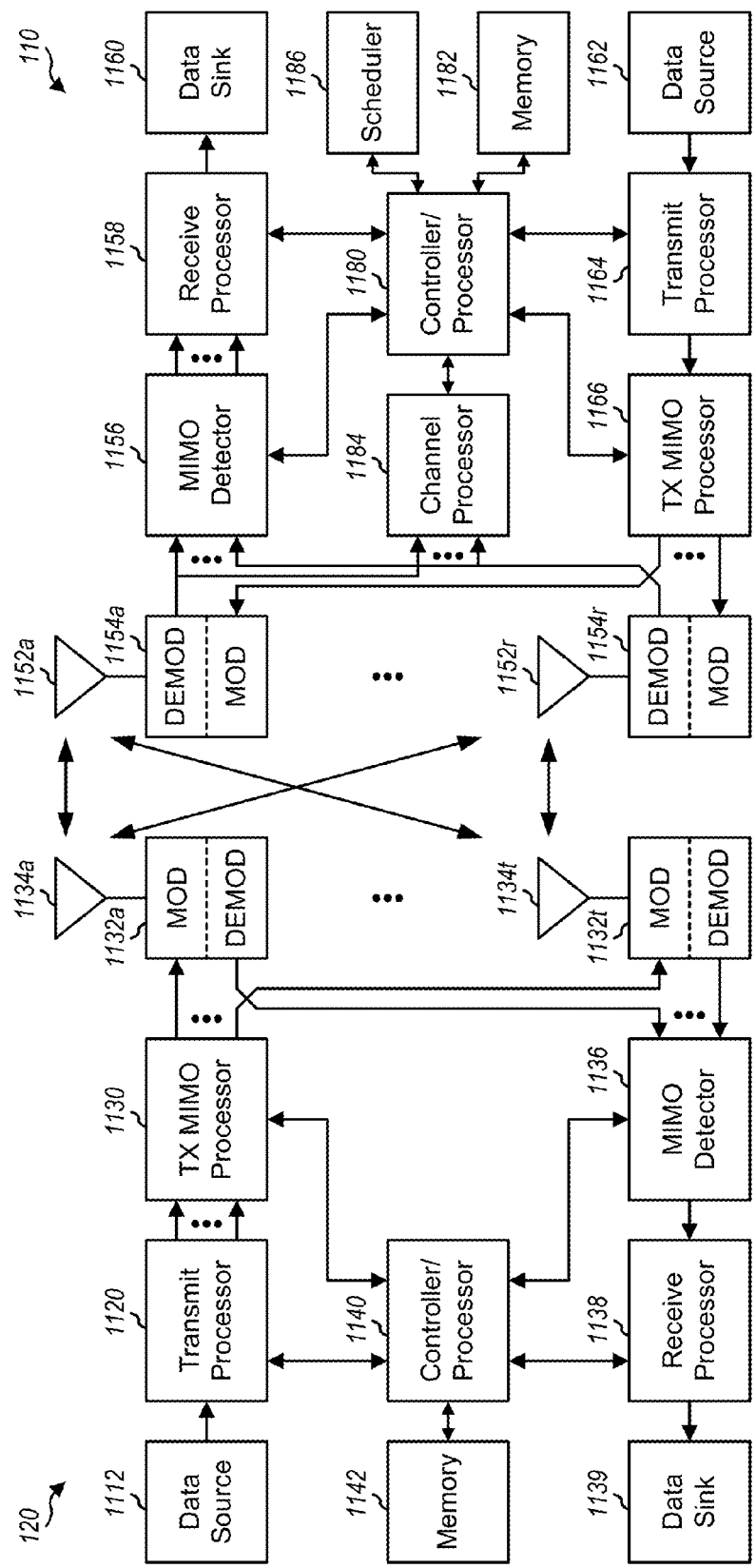
FIG. 11 shows a block diagram of a base station and a UE.

FIG. 11 shows a block diagram of a design of a base station/eNB 110 and a UE 120, which may be one of the eNBs and one of the UEs in FIG. 1. UE 120 may be equipped with T antennas 1134a through 1134t, and eNB 110 may be equipped with R antennas 1152a through 1152r, where in general T≥1 and R≥1.

At UE 120, a transmit processor 1120 may receive traffic data from a data source 1112, process (e.g., encode, interleave, and modulate) the traffic data based on one or more modulation and coding schemes, and provide modulation symbols for traffic data. Transmit processor 1120 may also process control data from a controller/processor 1140 and provide modulation symbols for control data. Transmit processor 1120 may also provide reference symbols for the DMRS, the SRS, and/or other reference signals. A transmit (TX) MIMO processor 1130 may perform spatial processing (e.g., precoding) on the symbols from transmit processor 1120, if applicable, and provide T output symbol streams to T modulators (MODs) 1132a through 1132t. Each modulator 1132 may perform DFT precoding for data (if applicable), map data symbols to data subcarriers, map reference symbols to pilot subcarriers, and map zero symbols to remaining subcarriers not used for transmission. Each modulator 1132 may further process the mapped symbols (e.g., for SC-FDMA, OFDM, etc.) to obtain an output sample stream. Each modulator 1132 may further process (e.g., convert to analog, amplify, filter, and upconvert) the output sample stream to obtain an uplink signal. T uplink signals from modulators 1132a through 1132t may be transmitted via T antennas 1134a through 1134t, respectively.

At eNB 110, antennas 1152a through 1152r may receive the uplink signals from UE 120 and may provide received signals to demodulators (DEMODs) 1154a through 1154r, respectively. Each demodulator 1154 may condition (e.g., filter, amplify, downconvert, and digitize) a respective received signal to obtain received samples. Each demodulator 1154 may further process the received samples to obtain received symbols for the K total subcarriers. Each demodulator 1154 may provide received reference symbols to a channel processor 1184 and received data symbols to a MIMO detector 1156. Channel processor 1184 may derive a channel estimate for each antenna at UE 120 based on reference symbols transmitted via that antenna. MIMO detector 1156 may perform data demodulation/MIMO detection on the received data symbols based on channel estimates for all T antennas at UE 120 (if applicable) and may provide demodulated data symbols. A receive processor 1158 may process (e.g., symbol demap, deinterleave, and decode) the demodulated data symbols, provide decoded traffic data to a data sink 1160, and provide decoded control data to a controller/processor 1180.

On the downlink, at eNB 110, traffic data from a data source 1162 and control data (e.g., resource/subcarrier assignments) from controller/processor 1180 may be processed by a transmit processor 1164, precoded by a TX MIMO processor 1166 if applicable, processed by modulators 1154a through 1154r, and transmitted via antennas 1152a through 1152r to UE 120. At UE 120, the downlink signals from eNB 110 may be received by antennas 1134, conditioned by demodulators 1132, processed by a MIMO detector 1136 if applicable, and further processed by a receive processor 1138 to obtain the traffic data and control data sent to UE 120.

Controllers/processors 1140 and 1180 may direct the operation at UE 120 and eNB 110, respectively. Processor 1120, modulators 1132, processor 1140, and/or other processors and modules at UE 120 may perform or direct process 900 in FIG. 9 and/or other processes for the techniques described herein. Processor 1120, modulators 1132, and/or other processors and modules at UE 120 may implement module 300 in FIG. 3, module 600 in FIG. 6, or module 700 in FIG. 7. Demodulators 1154, MIMO detector 1156, processor 1158, processor 1180, processor 1184, and/or other processors and modules at eNB 110 may perform or direct process 1000 in FIG. 10 and/or other processes for the techniques described herein. Demodulators 1154, channel processor 1184, MIMO detector 1156, and/or other processors and modules at base station 110 may implement module 800 in FIG. 8. Memories 1142 and 1182 may store data and program codes for UE 120 and eNB 110, respectively. A scheduler 1186 may schedule UEs for downlink and/or uplink transmission and may provide allocations of resources (e.g., subcarriers, cyclic shifts, etc.) for the scheduled UEs.

In one configuration, apparatus 120 for wireless communication may include means for performing a DFT on a set of modulation symbols for data to obtain data symbols, means for obtaining reference symbols generated based on a reference signal sequence corresponding to a cyclic shift of a base sequence, means for mapping the reference symbols to a first set of subcarriers in a symbol period, means for mapping the data symbols to a second set of subcarriers in the symbol period, means for generating a transmission symbol based on the mapped reference symbols and the mapped data symbols, and means for transmitting the transmission symbol via an antenna.

In another configuration, apparatus 110 for wireless communication may include means for receiving a transmission symbol in a symbol period, with the transmission symbol comprising reference symbols mapped to a first set of subcarriers and data symbols mapped to a second set of subcarriers, the reference symbols being generated based on a reference signal sequence corresponding to a cyclic shift of a base sequence, means for processing the received transmission symbol to obtain received reference symbols from the first set of subcarriers and received data symbols from the second set of subcarriers, means for processing the received reference symbols to obtain a channel estimate, means for processing the received data symbols based on the channel estimate to obtain demodulated data symbols, means for performing an IDFT on the demodulated data symbols to obtain received modulation symbols, and means for processing the received modulation symbols to recover data transmitted on the second set of subcarriers.

In an aspect, the aforementioned means may be processor 1120, modulators 1132, and/or processor 1140 at UE 120 and/or demodulators 1154, detector 1156, processor 1158, processor 1180 and/or processor 1184 at base station 110, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining reference symbols generated based on a reference signal sequence corresponding to a cyclic shift of a base sequence;
   mapping the reference symbols to a first set of subcarriers in a symbol period;
   mapping data symbols to a second set of subcarriers in the symbol period; and
   generating a transmission symbol based on the mapped reference symbols and the mapped data symbols.

2. The method of claim 1, further comprising:
   performing a discrete Fourier transform (DFT) on a set of modulation symbols for data to obtain the data symbols for the second set of subcarriers.

3. The method of claim 1, further comprising:
   receiving an assignment of M subcarriers, wherein the first set of subcarriers includes one subcarrier out of every S subcarriers among the M subcarriers, where M is greater than S, and S is greater than one.

4. The method of claim 3, wherein the second set of subcarriers includes at least one subcarrier among the M subcarriers and excludes subcarriers used to transmit reference symbols.

5. The method of claim 1, further comprising:
   mapping second reference symbols to a third set of subcarriers in a second symbol period;
   mapping second data symbols to a fourth set of subcarriers in the second symbol period; and
   generating a second transmission symbol based on the mapped second reference symbols and the mapped second data symbols.

6. The method of claim 5, wherein the symbol period and the second symbol period correspond to two symbol periods of a slot.

7. The method of claim 5, wherein the third set of subcarriers is staggered with respect to the first set of subcarriers.

8. The method of claim 1, further comprising:
   mapping second reference symbols to a third set of subcarriers in the symbol period;
   mapping second data symbols to a fourth set of subcarriers in the symbol period;
   generating a second transmission symbol based on the mapped second reference symbols and the mapped second data symbols;
   transmitting the transmission symbol via a first antenna; and
   transmitting the second transmission symbol via a second antenna.

9. The method of claim 8, wherein reference signals for the first and second antennas are frequency division multiplexed, and wherein the third set of subcarriers includes subcarriers not included in the first set of subcarriers.

10. The method of claim 8, wherein reference signals for the first and second antennas are code division multiplexed, wherein the second reference symbols are generated based on a second reference signal sequence corresponding to a second cyclic shift of the base sequence, and wherein the first set of subcarriers is equal to the third set of subcarriers.

11. The method of claim 8, further comprising:
   receiving an assignment of M subcarriers, wherein the second set of subcarriers is equal to the fourth set of subcarriers, and wherein the second and fourth sets of subcarriers each includes at least one subcarrier among the M subcarriers and excludes subcarriers used to transmit reference symbols.

12. The method of claim 1, wherein the reference symbols are for a demodulation reference signal (DMRS) used to demodulate the data symbols.

13. The method of claim 1, wherein the reference signal sequence has a length of P and includes P reference symbols, where P is the number of subcarriers in the first set of subcarriers.

14. The method of claim 1, wherein the base sequence comprises a Zadoff-Chu sequence or a computer-generated sequence.

15. An apparatus for wireless communication, comprising:
   means for obtaining reference symbols generated based on a reference signal sequence corresponding to a cyclic shift of a base sequence;
   means for mapping the reference symbols to a first set of subcarriers in a symbol period;
   means for mapping data symbols to a second set of subcarriers in the symbol period; and
   means for generating a transmission symbol based on the mapped reference symbols and the mapped data symbols.

16. The apparatus of claim 15, further comprising:
   means for performing a discrete Fourier transform (DFT) on a set of modulation symbols for data to obtain the data symbols for the second set of subcarriers.

17. The apparatus of claim 15, further comprising:
   means for mapping second reference symbols to a third set of subcarriers in a second symbol period, wherein the symbol period and the second symbol period correspond to two symbol periods of a slot;
   means for mapping second data symbols to a fourth set of subcarriers in the second symbol period; and
   means for generating a second transmission symbol based on the mapped second reference symbols and the mapped second data symbols.

18. The apparatus of claim 15, further comprising:
means for mapping second reference symbols to a third set of subcarriers in the symbol period;
means for mapping second data symbols to a fourth set of subcarriers in the symbol period;
means for generating a second transmission symbol based on the mapped second reference symbols and the mapped second data symbols;
means for transmitting the transmission symbol via a first antenna; and
means for transmitting the second transmission symbol via a second antenna.

19. The apparatus of claim 18, wherein reference signals for the first and second antennas are frequency division multiplexed, and wherein the third set of subcarriers includes subcarriers not included in the first set of subcarriers.

20. The apparatus of claim 18, wherein reference signals for the first and second antennas are code division multiplexed, wherein the second reference symbols are generated based on a second reference signal sequence corresponding to a second cyclic shift of the base sequence, and wherein the first set of subcarriers is equal to the third set of subcarriers.

21. An apparatus for wireless communication comprising:
at least one processor configured to obtain reference symbols generated based on a reference signal sequence corresponding to a cyclic shift of a base sequence, to map the reference symbols to a first set of subcarriers in a symbol period, to map data symbols to a second set of subcarriers in the symbol period, and to generate a transmission symbol based on the mapped reference symbols and the mapped data symbols,
a transceiver configured to transmit the generated transmission symbol.

22. A non-transitory computer-readable medium comprising:
code for causing at least one processor to obtain reference symbols generated based on a reference signal sequence corresponding to a cyclic shift of a base sequence,
code for causing the at least one processor to map the reference symbols to a first set of subcarriers in a symbol period,
code for causing the at least one processor to map data symbols to a second set of subcarriers in the symbol period, and
code for causing the at least one processor to generate a transmission symbol based on the mapped reference symbols and the mapped data symbols.

23. A method for wireless communication, comprising:
receiving a transmission symbol in a symbol period, the transmission symbol comprising reference symbols mapped to a first set of subcarriers and data symbols mapped to a second set of subcarriers, the reference symbols being generated based on a reference signal sequence corresponding to a cyclic shift of a base sequence;
processing the received transmission symbol to obtain received reference symbols from the first set of subcarriers and received data symbols from the second set of subcarriers;
processing the received reference symbols to obtain a channel estimate; and
processing the received data symbols based on the channel estimate to obtain demodulated data symbols.

24. The method of claim 23, further comprising:
performing an inverse discrete Fourier transform (IDFT) on the demodulated data symbols to obtain received modulation symbols; and
processing the received modulation symbols to recover data transmitted on the second set of subcarriers.

25. The method of claim 23, further comprising:
sending an assignment of M subcarriers to a user equipment (UE), wherein the first set of subcarriers includes one subcarrier out of every S subcarriers among the M subcarriers, where M is greater than S, and S is greater than one.

26. The method of claim 25, wherein the second set of subcarriers includes at least one subcarrier among the M subcarriers and excludes subcarriers used to transmit reference symbols.

27. The method of claim 23, further comprising:
receiving a second transmission symbol in a second symbol period, the second transmission symbol comprising second reference symbols mapped to a third set of subcarriers and second data symbols mapped to a fourth set of subcarriers;
processing the received second transmission symbol to obtain received second reference symbols from the third set of subcarriers and received second data symbols from the fourth set of subcarriers;
processing the received second reference symbols to obtain a second channel estimate; and
processing the received second data symbols based on the second channel estimate to obtain demodulated second data symbols.

28. The method of claim 27, wherein the symbol period and the second symbol period correspond to two symbol periods of a slot.

29. The method of claim 27, wherein the third set of subcarriers is staggered with respect to the first set of subcarriers.

30. The method of claim 23, further comprising:
receiving a second transmission symbol in the symbol period, the second transmission symbol comprising second reference symbols mapped to a third set of subcarriers and second data symbols mapped to a fourth set of subcarriers, the transmission symbol being transmitted via a first antenna and the second transmission symbol being transmitted via a second antenna at a user equipment (UE);
processing the received second transmission symbol to obtain received second reference symbols from the third set of subcarriers and received second data symbols from the fourth set of subcarriers;
processing the received second reference symbols to obtain a second channel estimate; and
processing the received data symbols and the received second data symbols based on the channel estimate and the second channel estimate to obtain the demodulated data symbols and demodulated second data symbols.

31. The method of claim 30, wherein reference signals for the first and second antennas at the UE are frequency division multiplexed, and wherein the third set of subcarriers includes subcarriers not included in the first set of subcarriers.

32. The method of claim 30, wherein reference signals for the first and second antennas at the UE are code division multiplexed, wherein the second reference symbols are generated based on a second reference signal sequence corresponding to a second cyclic shift of the base sequence, and wherein the third set of subcarriers is equal to the first set of subcarriers.

33. An apparatus for wireless communication, comprising:
means for receiving a transmission symbol in a symbol period, the transmission symbol comprising reference symbols mapped to a first set of subcarriers and data symbols mapped to a second set of subcarriers, the reference symbols being generated based on a reference signal sequence corresponding to a cyclic shift of a base sequence;

means for processing the received transmission symbol to obtain received reference symbols from the first set of subcarriers and received data symbols from the second set of subcarriers;

means for processing the received reference symbols to obtain a channel estimate; and means for processing the received data symbols based on the channel estimate to obtain demodulated data symbols.

34. The apparatus of claim 33, further comprising:

means for performing an inverse discrete Fourier transform (IDFT) on the demodulated data symbols to obtain received modulation symbols; and means for processing the received modulation symbols to recover data transmitted on the second set of subcarriers.

35. The apparatus of claim 33, further comprising:

means for receiving a second transmission symbol in a second symbol period, the second transmission symbol comprising second reference symbols mapped to a third set of subcarriers and second data symbols mapped to a fourth set of subcarriers, the symbol period and the second symbol period corresponding to two symbol periods of a slot;

means for processing the received second transmission symbol to obtain received second reference symbols from the third set of subcarriers and received second data symbols from the fourth set of subcarriers;

means for processing the received second reference symbols to obtain a second channel estimate; and means for processing the received second data symbols based on the second channel estimate to obtain demodulated second data symbols.

36. The apparatus of claim 33, further comprising:

means for receiving a second transmission symbol in the symbol period, the second transmission symbol comprising second reference symbols mapped to a third set of subcarriers and second data symbols mapped to a fourth set of subcarriers, the transmission symbol being transmitted via a first antenna and the second transmission symbol being transmitted via a second antenna at a user equipment (UE);

means for processing the received second transmission symbol to obtain received second reference symbols from the third set of subcarriers and received second data symbols from the fourth set of subcarriers;

means for processing the received second reference symbols to obtain a second channel estimate; and means for processing the received data symbols and the received second data symbols based on the channel estimate and the second channel estimate to obtain the demodulated data symbols and demodulated second data symbols.

37. The apparatus of claim 36, wherein reference signals for the first and second antennas at the UE are frequency division multiplexed, and wherein the third set of subcarriers includes subcarriers not included in the first set of subcarriers.

38. The apparatus of claim 36, wherein reference signals for the first and second antennas at the UE are code division multiplexed, wherein the second reference symbols are generated based on a second reference signal sequence corresponding to a second cyclic shift of the base sequence, and wherein the third set of subcarriers is equal to the first set of subcarriers.

39. An apparatus for wireless communication comprising:

a transceiver configured to receive a transmission symbol in a symbol period, the transmission symbol comprising reference symbols mapped to a first set of subcarriers and data symbols mapped to a second set of subcarriers, the reference symbols being generated based on a reference signal sequence corresponding to a cyclic shift of a base sequence, at least one processor configured to process the received transmission symbol to obtain received reference symbols from the first set of subcarriers and received data symbols from the second set of subcarriers, to process the received reference symbols to obtain a channel estimate, and to process the received data symbols based on the channel estimate to obtain demodulated data symbols.

40. A non-transitory computer-readable medium comprising:

code for causing at least one processor to receive a transmission symbol in a symbol period, the transmission symbol comprising reference symbols mapped to a first set of subcarriers and data symbols mapped to a second set of subcarriers, the reference symbols being generated based on a reference signal sequence corresponding to a cyclic shift of a base sequence, code for causing the at least one processor to process the received transmission symbol to obtain received reference symbols from the first set of subcarriers and received data symbols from the second set of subcarriers, code for causing the at least one processor to process the received reference symbols to obtain a channel estimate, and code for causing the at least one processor to process the received data symbols based on the channel estimate to obtain demodulated data symbols.

\* \* \* \* \*